United States Patent Office 3,489,697
Patented Jan. 13, 1970

3,489,697
METHOD OF CURING A SOLUTION OF RUBBER AND OF FOAMED RUBBER
George H. Brice, Glen Rock, N.J., assignor to Uniroyal, Inc., New York, N.Y., a corporation of New Jersey
No Drawing. Continuation-in-part of application Ser. No. 350,693, Mar. 10, 1964. This application Jan. 5, 1965, Ser. No. 423,575
Int. Cl. C08d 13/08
U.S. Cl. 260—2.5                    18 Claims

ABSTRACT OF THE DISCLOSURE

Solutions of unsaturated rubbers, such as polybutadiene, polyisoprene or EPDM, are gelled rapidly to a solid form-sustaining state at room temperature or moderately elevated temperature, by the action of a phenolic resin curative and an anhydrous catalyst which is a Lewis acid or sulfonic acid. Open-celled foams are made by gelling a solution of rubber partially, expanding the mixture to form a foam, freezing the foam to rupture the cells, removing the solvent and completing the cure. A high proportion of fibrous filler may be included in the foam.

---

This application is a continuation-in-part of my co-pending application Ser. No. 350,693, filed Mar. 10, 1964, now abandoned.

This invention relates to the cure of unsaturated hydrocarbon polymers in a fluid state without the need for elevated temperature, and more particularly it relates to effecting such cure by the action of polyhydroxymethyl phenolic compounds, using Lewis and sulfonic acids as promoters.

The invention also relates to a method of preparing open-celled foam articles from an organic solution of a polymeric material by a method involving freezing such solution in a foamed, at least partially gelled state.

The invention is further concerned with the use of fibrous fillers in solvated elastomer foams to obtain low density material with high load carrying capacity.

One object of the invention is to provide a method of curing unsaturated hydrocarbon polymers in fluid form, that is, in the form of a solution of slurry or similar fluidous composition such as a fluid, low molecular weight polymer. It will be understood that such unsaturated hydrocarbon polymers as cis-polybutadiene, cis-polyisoprene, or ethylene-propylene terpolymers are commonly prepared by copolymerizing the component monomer or monomers in a volatile organic solvent with the aid of a catalyst. The product of the polymerization process is a viscous solution commonly called a "cement." Conventional practice of making shaped articles from such solution prepared polymer involves first recovering the polymer in solid form by coagulating, washing and drying before use. It would be desirable if possible to by-pass these steps and to use the polymer directly in the form of a solution or cement, for example to make shaped articles by casting or extruding, or for impregnating or coating or the like, particularly if the polymer could be cured while the solution was maintained in the desired shape, after which the solvent would be removed. Unfortunately it has not heretofore been possible to cure or gel the polymer solution by known means, particularly at room temperature, in an effective and convenient manner so as to produce rapidly a good quality product. Sulfur monochloride can produce cure at room temperature but amounts large enough to produce rapid cure lead to a hard, over-cured elastomer. The invention is based on the discovery that cure of the polymer in solution can be accomplished by employing a polyhydroxymethyl phenolic compound as the curing agent and by employing Lewis acids or sulfonic acids as promoters of such cure. Thus, the invention makes it possible to use the polymer solution directly in manufacturing cured shaped rubber items. A rubber manufacturing plant adjacent to the polymerization plant can receive the solution through pipelines, make consumer items, and send the recovered solvent back to be reused in polymerization.

Another object of the invention is the provision of a method of making polymeric foam from a solution of the polymer in such manner that an open celled foam is obtained, and removal of the solvent is facilitated.

Still a further object of the invention resides in the provision of an elastomeric foam characterized by low density with high load carrying capacity, by reason of the presence of high loadings of fibrous filler in the foam.

The invention is applicable to unsaturated hydrocarbon polymers as exemplified by the diene polymers, such as polybutadiene or polyisoprene, especially polybutadiene or polyisoprene having a high content of cis-polymer, copolymer rubbers such as butyl rubber (i.e. copolymers based on isomonoolefins such as isobutylene and a small amount [e.g. 0.25 to 10%] of a conjugated diene such as isoprene), and even natural polymers such as balata, Hevea rubber, and the like. Depolymerized rubber may be used. Other unsaturated hydrocarbon polymers that may be mentioned are the rubbery interpolymers of at least two alpha-monoolefins (e.g., ethylene, propylene, butene-1, hexene-1, 4-methylpentene-1, 5-methylhexene-1, 4-ethylhexene-1, or similar olefins having the formula $CH_2=CHR$ in which R is hydrogen or a hydrocarbon radical, particularly a saturated alkyl hydrocarbon radical having from 1 to 8 carbon atoms) and at least on copolymerizable diene such as dicyclopentadiene, methylcyclopentadiene dimer, 1,4-hexadiene, 11-ethyl-1, 11-tridecadiene, 1,9-octadecadiene, 1,5-cyclooctadiene, or other suitable dienes (such rubbers are referred to hereinafter as "EPRD") such as are disclosed in British Patent 880,904 of Dunlop Rubber Co., Oct. 25, 1961, U.S. Patents 2,933,480, Gresham and Hunt, Apr. 19, 1960, and 3,000,866, Tarney, Sept. 19, 1961, and Belgian Patents 623,698 and 623,741 of Montecatini, Feb. 4, 1963; preferred are terpolymers of this kind containing from about 1 to about 25% (more preferably about 2 to about 15%) by weight of dicyclopentadiene or the like. In fact, the invention can be practiced with rubbers prepared by methods other than solution polymerization, for example by emulsion polymerization, e.g., emulsion polymerized diene homopolymers or copolymers including butadiene-styrene copolymer or copolymers with other copolymerizable monomers such as acrylonitrile, vinylpyridine, ethyl acrylate and the like. It will be understood that in every case the polymer is used in the invention in fluid form, that is, if normally solid the polymer is dissolved or slurried in an organic liquid, or else the polymer is used in a state of relatively low molecular weight so that the polymer is fluid in itself.

The polyhydroxymethyl phenolic compounds employed as curing agents in the invention may be in the form of a resin or in the form of components of such resin. Phenol dialcohols may be used, such as those disclosed in U.S. Patent 2,701,895, Tawney, et al., Feb. 15, 1955, particularly the resol type of phenolic resins which may be described as oil-soluble, heat-reactive 2,6-dimethylol-4-hydrocarbon phenols, wherein the hydrocarbon substituent is for example an alkyl group having 1 to 12 or more carbon atoms, as in 2,6-dimethylol-4-tert. butyl or octyl phenol. There may also be used halogenated forms of such materials, that is, especially halomethyl methylol phenols, including the resitols thereof, as described in U.S. Patent 2,972,600, Braidwood, Feb. 21, 1961 or British Patent 857,428, Esso Research and Engineering Co., May 30, 1958. Preferred halogenated curatives may be represented, in their monomeric form, by the structural:

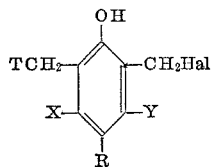

wherein Hal stands for halogen, especially bromine (preferred) or chlorine, T stands for an hydroxyl group or Hal as previously defined, X stands for hydrogen or hydrocarbyl (e.g., alkyl, aryl, aralkyl, having up to 16 carbon atoms), Y stands for hydrogen, hydroxy or hydrocarbyl as previously defined (especially alkyl having 1 to 8 carbon atoms), and R stands for a monovalent substituent such as a hydrocarbyl group as previously defined or a halogen (e.g. chlorine). Some examples are 2-bromomethyl-6-hydroxymethyl-4-tert.-butylphenol, 2-chloromethyl-6-hydroxymethyl-4-diisobutylphenol, and 2,6-di-(bromomethyl)-4-phenylphenol.

Preferred curatives ofr use in the invention are multicyclic phenols, that is, dimers, trimers and higher polymers, containing multiple units of the foregoing kind, which may be represented by the formula:

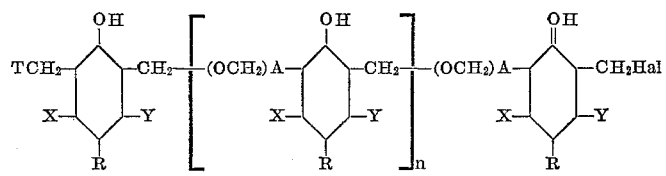

wherein Hal, T, X, Y, and R are as previously defined, A has a value of 0 or 1 and $n$ has a value of 0 or averages 1 or 2 or higher (up to for example 5 or 6 or even higher).

A highly preferred class of multicyclic phenols of the foregoing kind are represented by those in which T is OH or bromine, Hal is bromine, X and Y are hydrogen, R is an alkyl group having 4 to 16 carbon atoms, A is 1 and $n$ is not more than 2. Such multicyclic phenols are described in more detail by Braidwood, above cited, and the disclosure of Braidwood is therefore hereby incorporated herein by reference, as describing the preferred class of curatives. Such bromomethyl phenols as prepared commonly contain quantities of non-halogenated phenols; preferred prepartions are those containing from 1% to 9% bormine, more preferably 4% to 5% bromine. The compositions as commonly prepared are also believed to include material in which A is 0, that is, not all of the phenolic nuclei are joined by ether linkages. Both resols and resitols fall into this preferred category, as is explained by Braidwood.

Other preferred curatives used in the invention are those in which X and Y are hydrogen, A is 0, $n$ is 0 or 1, Hal is chlorine, T is chlorine and R is chlorine; when $n$ is 0 the curative is the dimer; 2,2'methylenebis (4-chloro-6-chloromethylphenol).

Still other preferred curatives are those in which X and Y are hydrogen, A is 0, $n$ is 0 or 1, Hal is chlorine, T is chlorine, and R is a lower alkyl (especially an alkyl group having from 2 to 6 carbon atoms). Thus, a particularly preferred chemical of this kind, wherein $n$ is 1, is the trimer 2,6-bis(2-hydroxy-3-chloromethyl-5-tert-butylbenzyl)-4-tert-butyl phenol.

Belgian Patent 632,223, Chemische Werke Albert, discloses equivalent phenolic curatives which may be used in this invention.

The Lewis or sulfonic acids which are employed as promoters of the phenolic cure in accordance with the invention include those organic and inorganic acids which are known to promote fast, exothermic reactions between aldehydes and phenols. Sulfonic acids in general may be used, as illustrated by the following non-limiting examples: dodecylbenzenesulfonic acid, benzenesulfonic acid, p-toluene sulfonic acid, chlorosulfonic acid, fluorosulfonic acid, and nonylbenzenesulfonic acid. Inorganic Lewis acids as a class are also operable, among which the following may be mentioned by way of non-limiting example: stannic chloride, aluminum chloride, zinc chloride, boron trifluoride, and stannous chloride. The heavy metal halides (in which category I include aluminum halides), especially chlorides, may be mentioned as a preferred class. It is desired to emphasize that such acidic promotor should be used in substantially anhydrous form, since the gelling or curing time is very much prolonged or even completely inhibited in the presence of water. For the same reason, the solvent employed should be substantially anhydrous. It will be understood that the choice of solvent is not critical, and any suitable conventional solvent for the polymer may be used, whether aliphatic, cycloaliphatic, or aromatic, including hydrocarbons, substituted hydrocarbons (e.g., halogenated), and the like.

It is desired to emphasize that it is a particularly advantageous feature of the invention that the cure or gelling of the polymer solution can be accomplished at room or ambient temperature (e.g. 20° C.), in a short time, in fact in a matter of seconds. Indeed, the cure proceeds with ample speed in many cases even below room temperature (e.g. 5° C. or 0° C.). However, for some purposes it may be desirable to employ moderately elevated temperatures (e.g., 80° C.), depending on the boiling point of the solvent, during at least a part of the process. Ordinarily, temperatures within the range from 15° to 50° C. will be satisfactory.

In accordance with the invention it is possible to produce effective cross-links in unsaturated polymers at room temperature by simply adding the necessary ingredients for phenolic resin preparation (i.e. polyfunctional phenols +aldehyde) to a solution of the polymer to be gelled or cross-linked and then preparing the resin in situ by addition of the acid catalyst. The cross-linking of the polymer occurs simultaneously with growth of the resin chain.

The use of this cure system is especially advantageous when used on the normally slow curing polymers with low unsaturation such as the butyl and EPRD rubbers. This invention can be applied in many novel and useful ways as for instance in the production of cast products such as films or blankets, coated surfaces including papers or fabrics, foam rubber, caulking and sealing compounds, spun fibers, tires, belts, rocket fuel binder, and other materials and products which can be quickly and conveniently produced with the aid of little or no applied heat.

We are aware of the Peterson, Batts U.S. Patent 2,726,224, Dec. 6, 1955, assigned to United States Rubber Company. These authors disclose the use of heavy metal halides as catalysts for the dimethylol phenol cure of butyl rubber. The application of heat to raise the temperature of a fully compounded rubber mix to at least 200° F. and preferably to temperatures above 300° F. is stipulated as a necessary condition for the successful practice of the Peterson, Batts patent. Nowhere in this patent is there any hint or indication that fast room temperature reaction might be obtained by the use of acids as accelerators for phenolic resin cures of unsaturated polymers. The possibility of producing a chemical reaction at room temperature between resin and unsaturated polymers in dilute solutions of polymers (as will be shown in the following examples) would appear to be even more unlikely if one were to extrapolate and apply the law of mass action to the teachings of this patent. Thus, our initial experimental discovery of the extreme catalytic potency of essentially anhydrous acids as set forth hereinafter was entirely unexpected. It has enabled us to solve certain technical problems in the area of product structure and fabrication where the fastest cure systems known to the art were found to be inadequate.

We are also aware of U.S. Patent 2,963,462, Braidwood, Dec. 6, 1960, which shows dimenthylol phenol cure of butyl rubber containing a Friedel-Crafts catalyst dissolved in a nitro-paraffin. This patent speaks of cements which can be cured at lower temperature and in a shorter time than in prior methods, but the lowest curing temperature disclosed is 200° F., at which temperature the cure apparently requires 300 minutes. There is no teaching in Braidwood of the possibility of extremely rapid low temperature cure by employing an anhydrous system, as in the present invention.

The practice of this invention involves the admixture of a suitable phenolic compound or resin (or components thereof) with a solution, slurry or fluidous composition containing unsaturated hydrocarbon polymer. This fluid compositions is then caused to set, gel or cure at room temperature by addition of a suitable acid catalyst (or components thereof). The absolute and relative amounts of reagents to be employed are, of course, dependent upon their overall concentration in the fluid mix. The amount of resin to be used to cure or gel the polymer will depend strongly upon the type of end product desired. For instance, if one desires a basically soft, resilient but well-cured product from EPRD rubber the preferred amount of resin to be used will fall in the range of 5 to 15% based on the elastomer. However, a 10% solution of EPRD rubber in benzene has been quickly gelled at room temperature using as little as 2% of a commercial resole resin based on rubber hydrocarbon. Smaller or larger amount (e.g. 1% to 20%) may also be used.

Any suitable conventional inert solvent for the rubber hydrocarbon may be used. The saturated aliphatic and aromatic volatile solvents of the heptane or benzene type are preferred when subsequent removal of the solvent from the shaped cured article (e.g. solution spun thread) is contemplated. If, however, the solvent is to remain as a part of the end use material then advantage can be taken of the reactivity of the resin towards ethylenic unsaturation to permanently tie the solvent to the rubber. Thus, if caulking or sealing compounds are prepared with unsaturated oils (e.g. linseed, tung, soybean oils) and oxidizible petroleum oils as softening compound the rubber and oil composition become chemically interconnected (via the resin) into a three dimensional, insoluble, non-volatile, non-migratory network and an ideal material is obtained for this end use.

The upper and lower limits of concentration of hydrocarbon polymer in the fluid mix will also be determined in large part by the end use of the mix. Caulking compounds or propellant binders can be prepared from 100% low molecular weight rubbers which are inherently fluid enough to permit low temperature mixing without the necessity of dilution with a solvent. Going to the other extreme, we have found that polymer solutions as dilute as 2% in benzene will gel at room temperature using this cure system.

It is desired to make reference to the effects of acidity of the acid, amount of moisture present, and the temperature of the reaction mixture on the activity or speed of gelation. A faster rate is obtained by choosing catalysts which are stronger acids, by increasing the temperature, or by decreasing the moisture content. Any of these three variables, or combinations of them, can be used to adjust the reaction rate to particular process requirements. Rate control is also possible through variations in the concentrations of the polymer, curing agent, and catalyst. Less catalyst is necessary for polymers of higher unsaturation, and vice versa. Rapid gelation of cis-polyisoprene cement is caused with as little as 0.1 part of stannic chloride per 100 parts rubber; much larger amounts may be used and there are no critical lower or upper limits, although to avoid overcure we do not ordinarily use more than 8 parts.

It is desired to point out an additional advantage of a rapid gelation time, when used with fluid polymers or polymer cements. The fast gelation permits the preparation of finished, dry rubber articles or composites containing fillers which are uniformly distributed throughout the rubber matrix. This is accomplished by thoroughly dispersing the filler in the fluid, compounded cement before gelation is effected. If the gelation were gradual, the filler would settle to the bottom of the fluid before being fixed in its dispersed form. The rapid gelation can be timed to take place as soon after the filler is distributed that the particles have no chance to settle.

It will be understood that the gel referred to herein is a result of the advancing cure (i.e., cross-linking) of the polymer and is not a separate phenomenon such as in thickening solution with gelatin.

The curing system of the invention may be employed in the method of making foam rubber described in co-pending application Ser. No. 350,649 of Ira D. Dobbs et al., filed of even date herewith.

The following examples, in which all quantities are expressed by weight unless otherwise noted, will serve to illustrate the practice of the invention in more detail. All the cements used in the examples were made by dissolving the dry rubber (from which polymerization catalyst residues had been substantially removed) in the solvent. The dryness of the solvent should be checked before adding the curing system. As explained previously water would slow the cure rate.

EXAMPLE 1

In Table I below are listed a number of polymers and the solvents used to make polymer solutions. Mixed into each of these solutions was SP–1055 resin (a commercial bromomethyl alkylated phenol-formaldehyde resin containing 3.6–3.9% bromine e.g. Example 2 of Braidwood 2,972,600) which was dissolved in a small amount of solvent. These mixtures are stable at room temperature. The addition of anhydrous stannic chloride, dissolved in a small amount of solvent, resulted in the cure of the polymer as evidenced by the thickening or gelation of the cement. The reactions took place at ambient temperature, about 20° C. Parts by weight of all ingredients are shown below:

Base recipe

| | |
|---|---|
| Polymer | 100 |
| Solvent | 900 |
| SP-1055 resin | 10 |
| Stannic chloride, anhydrous | 5 |

| Sample | Polymer | Solvent | Gel time |
|---|---|---|---|
| 1A | Cis-polybutadiene | Benzene | <15 sec. |
| 1B | Balata | do | <30 sec. |
| 1C | EPRD* | do | <1 min. |
| 1D | Butyl | n-Hexane | <30 min. |
| 1E | do | Benzene | <1 min. |

*Ethylene, propylene dicyclopentadiene terpolymer. (39.5% ethylene, 56.9% propylene, 3.6% dicyclopentadiene, in weight %)

The gel time is arbitrary and is a measure of the time from the addition of the catalyst to the time when the cement has thickened to a point where it is obvious that a cure is taking place. Measurement of viscosity with instruments such as the Brookfield Viscometer are impossible since the three-dimensional gel structure causes the gel to climb up the spindle as it rotates.

EXAMPLE 2

To illustrate, quantitatively, the viscosity increase of the polymer cement (gel development) as it cures, the rate of descent of a steel ball, 2.7095 g. with a diameter of 0.87 cm., was followed as it dropped through a curing (gelling) cement contained in a 250 ml. graduate.

Recipe (parts by weight)

| | |
|---|---|
| EPRD | 100 |
| Benzene | 1567 |
| SP–1055 (in benzene) | 10 |
| Stannic chloride, anhydrous (in benzene) | 2.75 |

The catalyst was mixed in last at zero time on a stop watch. The temperature of the gelling cement was 24° C. A portion of the compounded cement was poured into the 250 ml. graduate. The remaining portion was checked for gel development at 1 minute intervals. After 20 minutes the mixture had gelled noticeably and at this point the steel ball was dropped into the graduate from a point 5 cm. above the surface of the cement. The ball fell a distance of 13.4 cm. through the cement in 1 minute. Thereafter its descent was so slow that it required an additional 10 minutes to fall a distance of 4.5 cm. The ball stopped falling before it reached the bottom of the graduate. The terminal point was 18.4 cm. from the top surface of the cement.

EXAMPLE 3

To demonstrate the effect of the amount of catalyst on cure rate, Example 1–C was duplicated except for the amount of anhydrous stannic chloride. The decrease in catalyst concentration increased the gel time. The reactions were carried out at ambient temperature, about 20° C.

| Sample | Parts stannic chloride/ 100 parts polymer | Gel time |
|---|---|---|
| 1–C | 5 | <1 min. |
| 2 | 2 | 5–10 min. |

EXAMPLE 4

As further examples of Lewis acids as catalysts, zinc chloride and boron trifluoride were used to catalyze room temperature, SP–1055 cure of polymer cements. The SP–1055 and catalyst were each added as solutions in a small amount of solvent.

Recipe (parts by weight)

4A

| | |
|---|---|
| Cis-polyisoprene | 100 |
| Benzene | 2400 |
| SP–1055 (in benzene) | 10 |
| Zinc chloride, anhydrous (in ethyl ether) | 2 |

4B

| | |
|---|---|
| EPRD [1] | 100 |
| Benzene | 900 |
| SP–1055 (in benzene) | 10 |
| Boron trifluoride (in ethyl ether) | 2.2 |

[1] Ethylene:propylene; dicyclopentadiene terpolymer (39.5% ethylene, 56.9% propylene, 3.6% dicyclopentadiene, in weight percent.)

The catalyst solution was stirred into the mixture of SP–1055 and polymer cement. The 4A mixture gelled strongly within 11 minutes; the 4B mixture gelled strongly within 20 minutes.

EXAMPLE 5

In the table below are listed a number of sulfonic acids which were used to catalyze the room temperature, SP–1055 cure of a cis-polybutadiene polymer dissolved in benzene. Parts by weight are shown below:

Base recipe

| | |
|---|---|
| Cis-polybutadiene | 100 |
| Benzene | 900 |
| SP–1055 | 10 |

| Catalyst | | Parts catalyst* | Gel time |
|---|---|---|---|
| 5A | Nonylbenzenesulfonic acid | 5 | 1 min. |
| 5B | Chlorosulfonic acid | 5 | 25 min. |
| 5C | Fluorosulfonic acid | 5 | 1 min. |

*As 5% solution in glacial acetic acid.

If the mixture of 5B is heated to 70–75° C. the gel time can be reduced to about 5 minutes.

EXAMPLE 6

Another commercial resin, SB–1001 (a resole resin) which is a linear condensation product of a phenol (e.g., 4-tertiary butyl phenol or octyl phenol) and formaldehyde made in the presence of sodium hydroxide, and having terminal methylol groups; Reichold Chemicals, Inc.) was substituted for the SP–1055 in a typical reaction mixture and performed in the same fashion.

Base recipe

| | |
|---|---|
| Cis-polybutadiene | 100 |
| Benzene | 900 |
| SB–1001 | 10 |
| Stannic chloride, anhydrous | 5 |

The stannic chloride was added as a solution in a small amount of n-hexane and the mixture developed a strong gel at room temperature in <30 minutes.

EXAMPLE 7

The polyhydroxymethyl phenolic compounds employed as curing agents may be in the form of a resin, as in the preceding examples, or in the form of precursors of such a resin as shown below.

Base recipe

| | |
|---|---|
| Cis-polybutadiene | 100 |
| Benzene | 900 |

(7–A) 10 parts of 2,6-bisbromomethyl-4-methylphenol was added to the polymer cement. There was no gel development within 1 hour at about 20° C. or by heating a sample on a steam plate. A strong gel was obtained within 30 minutes at 20° C. after adding a solution of stannic chloride in a small amount of n-hexane (5 parts of stannic chloride, anhydrous).

(7–B) 10 parts of 2,6 - bishydroxymethyl - 4 - t - butylphenol was added to the polymer cement. A strong gel was obtained within 30 minutes at 20° C. by addition of the solution of stannic chloride in n-hexane (5 parts of stannic chloride, anhydrous).

(7–C) Gelation was also obtained by adding paraform to the polymer cement which already contained phenol and stannic chloride.

EXAMPLE 8

Films of a compounded polymer were cast from solution onto a flat plate.

CAST FILM RECIPES
[Parts by weight]

| | 8–A | 8–B |
|---|---|---|
| EPRD | 100 | 100 |
| n-Hexane | 900 | 900 |
| SP–1055 | 10 | 10 |
| Stannic chloride, anhydrous | 5 | |

After the solvent had evaporated (left overnight at room temperature) the films were stripped from the plate and examined. The film from the 8–A recipe showed all the properties of a normal vulcanizer while the film from the 8–B recipe was uncured. One-half of the 8–B film was exposed to vapors of anhydrous stannic chloride overnight at about 20° C. in a closed container and a somewhat overcured vulcanizate was obtained. The untreated half remained in the unvulcanized state.

EXAMPLE 9

The solvent present in the polymer cement can be used to produce thin sections of vulcanized, foamed polymer. Heating the compounded cement causes the solvent to vaporize and expand the cement while it is curing.

Foam recipe (parts by weight)

| | |
|---|---|
| EPRD | 100 |
| n-hexane | 900 |
| SP-1055 | 10 |
| Solka Floc BW-100 [1] | 100 |
| Stannic chloride, anhydrous | 3 |

[1] Solka Floc BW-100 is a fibrous cellulosic filler. It functions as a filler, a reducer of foam shrinkage, a dessicant, and a bubble initiator.

The compounded cement was poured into a shallow mold and allowed to cure for 30 minutes. The mold was then placed on a steam bath where the solvent vaporized and expanded the structure as it completed its cure. The result was an expanded, cured disk which had a porous, uniform, cellular structure.

In another important aspect, the invention is directed to a method of preparing open-celled foam articles from organic solution of polymeric materials. More particularly, it has been discovered that open-celled, resilient foam suitable for use as a cushioning or insulating material can be made by freezing (and subsequently drying) stable foam prepared from solutions of elastomers in suitable solvents. These stable foams may be prepared by cross-link gelation of cements of unsaturated elastomers by the method described above, or by any other suitable method such as that described in copending application Ser. No. 350,649, previously referred to.

There are two broad classes of open-celled foams known today. They are the latex foams prepared from frothed aqueous despersions of discrete rubber particles and the polyurethane foams prepared from gas expanded or blown "prepolymers" which are of such low molecular weight to be fluid at the frothing stage. The foams of the present invention differ from both of these commercial products in that the polymer to be foamed is a solid which is actually dissolved in a suitable organic solvent or solvent combination. The wet foams produced from such cements are inherently closed cell. This presents a serious problem in drying cement foams of fairly thick cross-section because the solvent must migrate through multitudinous membranes before escaping to the surface. Also since the solvent is an item of considerable expense it must be recovered in a rapid and economical way. Furthermore, ordinarily a closed cell non-compressible foam, completely unsuitable as a comfort cushioning material, is obtained. The invention overcomes these difficulties in a simple and economical fashion by a method involving the freezing of foams prepared from elastomeric materials which are dissolved in a suitable solvent or solvent combination. This freezing process serves the purpose of rupturing the individual bubble walls throughout the mass of the foam thus providing a steroreticulate structure for rapid solvent removal. Subsequent drying and completion of vulcanization yields a compressible, resilient cushioning material.

The foams may be frozen at atmospheric pressure so that there is no volume change or the poured, wet foam may be vacuum expanded (as in the Talaley process described by E. W. Madge "Latex Foam Rubber," p. 90) and then frozen.

It is also possible to open the cells of cement foam by freezing without the use of any molds whatsoever (see Example 16). For instance, cement foams poured onto a conveyor belt as in slab stock production or spread onto fabrics or carpeting will convert to open cells when frozen even though there are no side or top surfaces for support as when molds are used.

Temperatures which can be used in the freezing step cover a wide range, the only requirement being that the wet, viscous foam be subjected to a temperature decrease sufficient to solidifiy a significant part of the solvent. Thus, it is possible to open the cells of wet foam above room temperature by preparing a stable foam from a rubber solution which has been heated to render it fluid. Solvents such as naphthalene and diphenylmethane whose freezing points normally lie above room temperature may be used in the preparation of such cements. However, using the cure system of the invention it is not necessary to use heat in order to prepare a stable foam and it is more convenient to carry out the foam making process at or below room temperature. The solvent is then crystallized by chilling the resultant foam. Temperatures as low as minus 70 or 80° C. or even lower may be used to freeze the foam if required. In practice, solvents which have a relatively high freezing point but which are liquids at room temperature are preferred. Benzene and cyclohexane are examples of solvents which are admirably suited to this process.

In addition to the foregoing it appears also that the solvent power of the solvent or solvent combination is reduced as the temperature of the foam drops so that the solvent is actually expelled by or separates from the rubber. This syneresis of the solvent has a drying effect on the bubble film and reduces its elasticity. At the same time the solvent forms solid crystals which help rupture the cells and cause them to become interconnecting. Benzene is a preferred solvent for many of the hydrocarbon polymers such as EPRD, cis-polybutadiene and cis-polyisoprene. It is readily possible to select the best elastomer/solvent combination for any given polymer by preliminary trial. It is also possible to use an easily frozen solvent such as benzene blended with another solvent such as hexane which has a much lower freezing point. Thus, the foam need be chilled only to some temperature intermediate between the freezing points of the two solvents to cause the higher melting one to crystallize out and rupture the cell walls.

Once the foam cells are open several methods are available for removal and recovery of solvent. It has been found that the foam (either still frozen or allowed to melt) is now permeable to gases and liquids.

(1) The foam may be heated above the boiling point of the solvent without fear of ballooning (see Example 10).

(2) The solvent may be extracted with another solvent which is a nonsolvent for the elastomer. This is conveniently accomplished by exercising or flexing the open-celled foam while submerged in the extracting solvent (see Example 11).

(3) The foam may be dried by passing a gas such as air or steam through it (see Example 12).

(4) The foam may be placed in a vacuum chamber and the solvent vaporized at relatively low temperatures. By maintaining a sufficiently low vacuum the solvent remains frozen and vaporizes by sublimation. This method results in the least shrinkage of the foam and is preferred for the preparation of foams of lightest density (see Example 13).

The foam is of course sufficiently gelled, before freezing, to prevent collapse or partial collapse of the foamed structure, that is, the foam is gelled sufficiently to be form-sustaining. If the frozen foam contains large voids it indicates insufficient gelling before freezing. There is believed to be no upper limit to the amount of gelation (cure) present before freezing, that is, the foam may be completely gelled.

The following examples illustrate particularly the described freeze-foam feature of the invention.

EXAMPLE 10

Using drying method #1

The following recipe (500 g.) is poured into a pipe bomb which is only partially filled by the cement.

Recipe: Parts
- EPRD (as in Example 1, for example) _____ 100
- Benzene _____ 1570
- SP–1055 Resin (in 100 parts benzene) _____ 10
- Solka Floc BW–100 (dry) _____ 100
- Anhyd. SnCl$_4$ (in 150 parts benzene) _____ 1.65

The bomb is hermetically sealed and dry air under pressure (200 p.s.i. gauge) is introduced to the space above the cement in the bomb through a pipe connection and valve provided for this purpose. The closed bomb is placed on rollers and rotated for 5 minutes. During this time gas is absorbed by the cement and the curing agents cause the cement to start to gel. The bomb is removed from the rollers and the cement is allowed to drain to the bottom of the bomb. By means of a valve in the bottom of the bomb, samples of foam are blown into ¼ pt. friction top metal cans at 17 to 21 minutes following catalyst (SnCl$_4$) addition. The samples are capped, allowed to sit for one hour to develop further gel then placed in a 0° C. refrigerator to freeze overnight. On the following day the cans are removed from the refrigerator and allowed to warm to room temperature. They are cut open, the foams removed and placed in circulating air oven at 100° C. to dry. They are dried to constant weight in 2.5 hours without ballooning. The dried cured foams are open-celled and resilient.

EXAMPLE 11

Using drying method #2

A recipe identical to that in Example 10 was made up except that only 1.1 part SnCl$_4$ catalyst was used. The mix was pressurized with 200 p.s.i. dry air and samples were blown into ¼ pt. friction top metal cans at 20 min. following addition of catalyst (temperature 29° C.). The cans were capped, allowed to stand at room temperature for 30 min. then placed in 0° C. refrigerator overnight. On the following day one of the samples was removed from the can and weighed: 58 g. This sample was submerged in acetone and exercised (alternately compressed and released) while still frozen. After 10 minutes of exercising the foam was squeeze-dried and immediately weighed: 10.5 g. Final dry weight was 7 g. Thus, at least 93% of the benzene had been extracted in 10 minutes. Vulcanization was completed by heating for 30 minutes at 80° C. A firm, resilient foam showing a fine uniform open celled structure was obtained.

EXAMPLE 12

Using drying method #3

The recipe and procedure of Example 11 was repeated except that the foam was blown into a ¼ pt. cylindrical metal mold equipped with six evenly spaced metal pins. The pins were attached to the bottom of the mold and extended vertically the full height of the mold. The foam was frozen then removed from the mold. The bottom ends of the open channels were stoppered with small corks. Flexible tubes leading from a manifold attached to an air pressure source were fitted snugly to the top of each channel and air was forced through the frozen foam. The pressure was gradually increased up to 60 mm. Hg. At the end of 1 hour, 90% of the solvent had been removed. After complete drying and vulcanization an open-celled, resilient foam was obtained.

EXAMPLE 13

Using drying method #4

The recipe and procedure of Example 11 was repeated except that three ¼ pt. cans containing the foam samples were submerged in ice water according to the following schedule.

Hours at 1° C.: Sample
- A _____ 1
- B _____ 2
- C _____ 3

At the end of the specified times the frozen foam samples were released from their molds and vacuum dried (overnight) to constant weight without application of heat. Cure was completed by heating for 30 minutes at 80° C. The samples were cut through the center and examined. Sample A which had expanded visibly while being dried under vacuum had a network of stretched, collapsed cells in the center measuring about 1⅜″ in diameter. The line of demarcation between this softened area and the firm resilient outer shell was quite sharp; it was obviously the portion of the sample which had failed to freeze in one hour. Sample B was much better than A but contained a similar weak area in the center measuring about 1″ in diameter. Sample C was the best of the three. It was a fine-textured, open-celled, resilient but firm piece of foam. There was a small weakened structure in the center measuring about ¼″ in diameter.

This experiment was repeated but with an acetone bath kept at minus 25 to minus 30° C. as the freezing medium. Freeze times were shortened to 30, 60 and 90 minutes. Only the sample frozen for 30 minutes showed the typical soft center resulting from stretched cells of unfrozen foam.

EXAMPLE 14

Foam rubber from cis-poly-butadiene cement

The following recipe was mixed under anhydrous conditions and a portion pressurized with 200 p.s.i. dry nitrogen.

Recipe: Parts
- Cis-BR (Ameripol CB–220) _____ 100
- Benzene _____ 2120
- Solka floc BW–100 (dry) _____ 100
- SP–1055 resin (in 100 parts benzene) _____ 10
- Anhyd. SnCl$_4$ (in 4.0 parts benzene) _____ 0.44

At 31 minutes after the catalyst had been added the foam was blown into a rectangular metal mold of 735 ml. capacity (temperature 26° C.). The mold was closed and the foam frozen by holding overnight at 0° C. The frozen benzene was then extracted with acetone as in Example 2. Vulcanization was completed by heating for 30 minutes at 80° C. A resilient piece of open-celled foam of fine, uniform cell structure was obtained.

A smaller piece of frozen foam from the same mix was extracted with methanol instead of acetone; similar results were obtained.

EXAMPLE 15

Foam rubber from cis-polyisoprene cement

The following recipe was pressurized with 300 p.s.i. nitrogen and blown into ¼ pt. cans as molds at 30 to 33 minutes following addition of catalyst.

Recipe: Parts
- Cis-Polyisoprene (Shell 309) _____ 100
- Carbon black (Spheron 6) _____ 50
- Solka floc BW–100 _____ 100
- Benzene _____ 2860
- SP–1055 resin (in 100 parts benzene) _____ 10
- Zinc chloride (dry, in 76 parts benzene) ____ 7.6

The foam was frozen at −5° C. and vacuum-dried as in Example 4. Cure was completed by heating for 1 hour at 100° C. The finished samples were open-celled and resilient.

EXAMPLE 16

Freezing cement foam without a mold

A recipe identical to that in Example 11 was pressurized with 200 p.s.i. nitrogen. A sample of foam was blown onto a flat glass plate at 22 minutes following catalyst addition (temperature 27° C.) The foam was allowed to flow out without restraint. It was covered with an inverted dish to prevent evaporation of benzene while it developed higher gel (one hour at room temperature). The cover was removed and the foam frozen by submersion in and direct exposure to ice water for about 2 hours. Benzene was then extracted from the open-celled frozen foam by exercising under acetone as in Example 2. After final drying and vulcanization a good sample of open-celled, resilient foam about ⅜″ thick was obtained.

EXAMPLE 17

Use of cyclohexane as a solvent

The following recipe was made with reagent grade cyclohexane, M.P. 5° C. It was pressurized with 300 p.s.i. nitrogen and foam samples were blow into ¼ pt. metal cans as molds. Pre-blow gel time was 22 to 24 minutes at room temperature (ca. 25° C.).

| Recipe | Parts |
| --- | --- |
| EPRD | 100 |
| Cyclohexane | 1575 |
| Solka Floc BW–100 (dry) | 100 |
| SP–1055 resin (in 100 parts cyclohexane) | 10 |
| Anhyd. $SnCl_4$ (in 40 parts benzene) | 10 |

Two of the blown foam samples were sealed and immediately placed in an acetone/Dry Ice bath at minus 30 to 35. One of the frozen samples was removed from the can at the end of 2 hours freeze time and placed under high vacuum at room temperature to dry. The second sample was allowed 5 hours freeze time then treated similarly. After drying overnight to constant weight the samples were heated for one hour at 100° C. to complete the cure. The finished foam was open-celled and resilient.

EXAMPLE 18

Freezing a cement foam without filler

The following recipe was pressurized with 300 p.s.i. nitrogen and blow into ¼ pt. metal cans after 14 to 16 gel time.

| Recipe: | Parts |
| --- | --- |
| EPRD | 100 |
| Benzene | 1570 |
| SP–1055 resin (in 100 parts benzene) | 10 |
| Anhyd. $SnCl_4$ (in 20 parts benzene) | 2.38 |

The blown foams were sealed and allowed to stand at room temperature for one hour. The cells were then opened by freezing overnight at −5° C. The samples dried under vacuum without expanding to obtain open-celled foam.

Another important aspect of the invention is concerned with the use of fibrous fillers in solvated elastomer foams to obtain low density material with high blood carrying capacity. This is accomplished by incorporating large amounts (10 to 200 parts per 100 parts by weight of rubber) of fibers such as cellulosic, organic synthetic (e.g., nylon, polyester, polypropylene) or mineral (e.g., asbestos, glass) fibers in the cement prior to foaming. These highly filled cements when foamed, gelled, dried and cured show superior load carrying capacity when compared with conventional latex foams at the same density. Furthermore, the very high shrinkage of unfilled cement foams on drying is reduced to more practical levels. The fibrous materials may be used as sole filler, or they may be used in conjunction with particle type fillers such as carbon black, silica, talc, hydrated aluminum, etc.

Although various types of fillers have been used for years in latex foams, it has not been possible to get satisfactory results in frothed latex containing more than 10% of cotton linters for example, because the frothed latex is so viscous that it is extremely difficult to handle, and it gives an undesirably stiff, boardy product. In addition the method of fiber addition to latex is stated to be critical, it being necessary to partially froth the latex before incorporating the linters. In contrast, when the elastomer is dissolved in an organic solvent as in the subject invention rather than being dispersed in water, recipes using 150 or more parts of fibrous filler on RHC may be completely compounded prior to frothing without excessive increase in viscosity. Preferred products of the invention contain 50–200 parts of fibers phr.

Fiber-filled cement foams prepared as described above differ from known rubber foams in their superior load carrying capacity at a given density. Furthermore, this improvement is brought about while using much less rubber which is the most expensive ingredient of elastomeric foams. These and other advantages are realized without sacrificing the properties required in high quality cushioning material. Open celled foams containing 100 or more parts of fibrous filler are compressible, highly resilient structures closely resembling conventional latex foam in strength and durability.

The following example illustrates this feature of the invention.

EXAMPLE 19

Preparation of highly loaded cement foams

A stock solution of 10% EPRD in benzene is prepared. The particle type fillers such as carbon black and Hi-Sil are dispersed in the stock cement by first dispersing in benzene with a high speed mixer. The rubber solution is added gradually to the dispersion. The fibrous fillers may be wetted first with diluent benzene or they can be dispersed directly in the cement without difficulty. The gelling and curing agent (10 parts SP–1055 phenolic resin on RHC) is then added as a 10% solution in benzene. The catalyst (1 to 5 parts anhydrous stannic chloride as a 10% solution in benzene) is added last. The completed mixes are 4 to 6% RHC with up to 15% total solids. All of the mixing apparatus and the ingredients are dried and protected from moisture. The presence of excessive moisture prolongs the gel time and permits settling of the fibrous fillers. This is undesirable when uniform samples of foam are required. As soon as the catalyst solution is completely mixed in, the compound is poured into a pipe bomb and pressurized with 200 to 300 p.s.i. $N_2$ gas as described in previous examples. The higher pressures give foams of lighter density. When the proper degree of gelation has been reached, i.e. when a stable foam can be blown (15 to 30 minutes), the cement is allowed to expand into ¼ pt. cylindrical molds measuring 2″ high and 2⅜″ diameter. After developing further gel at room temperature for 30 to 60 minutes the foams are frozen at −5° C., removed from the molds and dried under vacuum while still frozen. Shrinkage from molded volume runs 25 to 35% depending on the amount of filler present. Vulcanization is completed by heating for one hour at 100° C. Samples containing carbon black require one hour at 165° C. to develop full cure.

A sample of cement foam prepared according to the foregoing procedure but containing no filler of any kind showed a volume shrinkage of 68%. Another sample which was frozen and then allowed to melt and dry exhibited 83% volume shrankage. Furthermore, these unfilled foams are logy and weak; they lack the strong, resilient snap-back following compression which is so characteristic of the new fiber-filled foams of the invention.

|  | 19-A | B | C | D | E | F | G | Latex [4] |
|---|---|---|---|---|---|---|---|---|
| EPRD | 100 | 100 | 100 | 100 | 100 | 100 | 100 | |
| Spheron 6 | 50 | | | | | | 100 | |
| Hi-Sil 233 | | | 50 | | | | | |
| Solka Floc BW-100 [1] | 150 | 150 | 150 | | | | | |
| Wood Flour, 200 mesh | | | | 150 | | | | |
| Pulverized Newspaper, 40 mesh | | | | | 100 | | | |
| Glass Fibers, HDX-25 [2] | | | | | | 50 | | |
| Rock Wool [3] | | | | | | | 150 | |
| Density, lb. ft.[3] | 4.1 | 4.2 | 4.2 | 3.8 | 4.7 | 2.9 | 3.7 | 6.1 |
| Pressure required for 25% [5] Compression, g./cm.[2] | 25 | 31 | 39 | 24 | 39 | 14 | 15 | 23 |

[1] A commercial cellulose fiber. BW-100 type is 16 microns average thickness and 80 microns average length.
[2] Milled glass fibers, approximate maximum length is 1/64″.
[3] Chopped fibers from an insulation batt. Fibers were not measured but are estimated at up to 1/8″ in length.
[4] Data were obtained on small cylindrical test samples of approximately the same shape and size as the molded cement foam samples. They were cut from commercial latex foam flat stock containing high loadings of talc and some hydrated alumina as reinforcing fillers.
[5] Measured with a triple beam, single pan balance modified with a yoke, over the pan, which supports a micrometer-adjusted presser foot so that a given loan or compression is obtained by proper adjustment of the scale weights and the distance between the scale pan and presser foot. A picture of this apparatus may be seen in Report 52-2, September 1952 concerning "Neoprene Latex Foam" and published by the Rubber Chemicals Div. of E. I. du Pont de Nemours & Company (Inc.).

It will be understood that in the form of the invention in which open-celled foam is produced by the described freezing technique, and/or in the form of the invention in which fibrous filler is incorporated in the foam as described, other gelling or curing agents may be employed in place of the preferred phenolic curative/acidic catalyst combination. Thus, sulfur curing may be employed if desired, particularly sulfur curing systems based on highly activated, low temperature accelerated compositions.

Having thus described my invention, what I claim and desire to protect by Letters Patent is:

1. A method of making a rubbery gelled shaped article from an unsaturated hydrocarbon rubber selected from the group consisting of diene homopolymer rubbers and rubbery copolymers of a diene with a copolymerizable monomer, comprising mixing a solution of said rubber in an inert organic solvent with from 1 to 20% of a phenolic resol curative for said rubber selected from the group consisting of halogen-free dimethylol phenols and halogenated dimethylol phenols, and from 0.1 to 8% of an anhydrous, non-complexed, acidic catalyst for said curative selected from the group consisting of inorganic Lewis acids and organic sulfonic acids, the said percentages being based on the weight of the rubber, and subjecting the resulting mixture, in an anhydrous condition, to a temperature of from 0° C. to 80° C. while in the desired shape whereby the said mixture sets in said shape.

2. A method as in claim 1 in which the said rubber is a terpolymer of ethylene, propylene, and a copolymerizable diene.

3. A method as in claim 2 in which the said copolymerizable diene is dicyclopentadiene.

4. A method as in claim 1 in which the said rubber is polybutadiene.

5. A method as in claim 1 in which the said rubber is balata.

6. A method as in claim 1 in which the said rubber is butyl rubber.

7. A method as in claim 1 in which the said temperature to which the mixture is subjected is from 15° to 50° C.

8. A method as in claim 1 in which the said temperature to which the mixture is subjected is room temperature.

9. A method as in claim 1 in which the said acidic catalyst is an inorganic Lewis acid.

10. A method as in claim 1 in which the said temperature is in excess of the boiling point of the said solvent whereby the rubber foams as it gels.

11. A method of making a rubbery gelled shaped article from an unsaturated hydrocarbon rubber selected from the group consisting of diene homopolymer rubbers and rubbery copolymers of a diene with a copolymerizable monomer comprising mixing said rubber in low molecular weight liquid state with from 1 to 20% of a phenolic resol curative for said rubber selected from the group consisting of halogen-free dimethylol phenols and halogenated dimethylol phenols, and from 0.1 to 8% of an anhydrous, non-complexed, acidic catalyst for said curative selected from the group consisting of inorganic Lewis acids and organic sulfonic acids, the said percentages being based on the weight of the rubber, and subjecting the resulting mixture, in an anhydrous condition, to a temperature of from 0° C. to 80° C. while in the desired shape whereby the said mixture sets in said shape.

12. A method as in claim 1 in which the said solution is formed as it gels, and the resulting foam is thereafter frozen whereby the said rubber separates from the said solvent and the cells of the foam rupture, thereafter removing the solvent from the resulting open-cell foam, and completing the cure of the rubber.

13. A method as in claim 12 in which the said foaming is brought about by applying gas under pressure to the solution to absorb the gas therein, and thereafter releasing the solution in a partially gelled condition into a space at lower pressure whereby the solution expands to form a froth.

14. A method as in claim 12 in which the said solution contains from 10 to 200 parts by weight, per 100 parts by weight of rubber, of fibrous filler.

15. A method of making an open-celled foam rubber comprising providing a solution of an unsaturated hydrocarbon polymer rubber in an inert organic solvent adding to the solution a phenolic curative for the polymer and an acidic catalyst, under substantially anhydrous conditions, foaming the solution and curing the foam at least sufficiently to be form-sustaining, freezing the foam whereby the rubber separates from the solvent in said solution, removing the solvent and thereafter completing the cure of the rubber.

16. A method of making a cured, shaped, open celled foam article from an ethylene-propylene-diene terpolymer rubber comprising providing an anhydrous solution of said rubber in a solvent selected from the group consisting of benzene and cyclohexane, mixing the solution with a phenolic curative selected from the group consisting of halogen-free dimethylol phenols and halogenated dimethylol phenols and an acidic substance selected from the group consisting of heavy metal halides and sulfonic acids, applying gas under pressure to the solution to absorb the gas therein, gelling the solution containing the gas, releasing the gelled solution into a space at lower pressure whereby the solution expands to form a froth, freezing the froth whereby the solvent separates from the rubber and the walls of the cells in said froth are opened, removing the solvent and completing the cure of the rubber.

17. A method as in claim 16 in which the solution contains 10–200 phr. of cellulosic fibers.

18. A method as in claim 15 in which the solution contains 10–200 phr. of fibrous filler.

References Cited
UNITED STATES PATENTS

| | | | |
|---|---|---|---|
| 3,080,334 | 3/1963 | Kolaczewski | 260—2.5 |
| 3,130,171 | 4/1964 | Sutherland | 260—2.5 |
| 3,215,647 | 11/1965 | Dunn | 260—2.5 |
| 3,277,209 | 10/1966 | Gillen | 260—846 |
| 3,287,440 | 11/1966 | Gillen | 260—846 |

MURRAY TILLMAN, Primary Examiner

M. FOELAK, Assistant Examiner

U.S. Cl. X.R.

260—38, 41.5, 80.78, 82.1, 83.3, 83.5, 85.1, 85.3, 94.7, 845, 846, 848